(12) United States Patent (10) Patent No.: US 8,523,514 B2
Eastwood et al. (45) Date of Patent: Sep. 3, 2013

(54) COMPOSITE SLIDER SEAL FOR TURBOJET PENETRATION

(75) Inventors: Jonathan Jeffery Eastwood, Newington, CT (US); Judith F. Brooks, Oakland, CA (US)

(73) Assignee: United Technologies Corporation, Hartford, CT (US)

( * ) Notice: Subject to any disclaimer, the term of this patent is extended or adjusted under 35 U.S.C. 154(b) by 952 days.

(21) Appl. No.: 12/625,704

(22) Filed: Nov. 25, 2009

(65) Prior Publication Data

US 2011/0123319 A1    May 26, 2011

(51) Int. Cl.
*F04D 29/00* (2006.01)
(52) U.S. Cl.
USPC .......................................... 415/118; 415/201
(58) Field of Classification Search
USPC ......................................... 415/118, 201, 230
See application file for complete search history.

(56) References Cited

U.S. PATENT DOCUMENTS

| | | | |
|---|---|---|---|
| 3,000,846 A | 9/1961 | Runton et al. | |
| 3,793,838 A | 2/1974 | Nash | |
| 4,214,761 A | 7/1980 | Pippert | |
| 4,216,651 A | 8/1980 | Ormerod | |
| 4,591,794 A | 5/1986 | Shattuck et al. | |
| 5,104,286 A | 4/1992 | Donlan | |
| 5,836,048 A | 11/1998 | Rossman et al. | |
| 6,942,452 B2 | 9/2005 | Bruno et al. | |
| 7,168,236 B2 | 1/2007 | Schmotolocha et al. | |
| 7,238,247 B2 | 7/2007 | Bouillon et al. | |
| 7,249,929 B2 | 7/2007 | Cummings et al. | |
| 7,266,945 B2 | 9/2007 | Sanders | |
| 7,434,383 B2 | 10/2008 | Vintilescu et al. | |
| 2006/0055119 A1 | 3/2006 | Hatori | |
| 2006/0097457 A1 | 5/2006 | Flaherty | |
| 2006/0288687 A1 | 12/2006 | Bruno et al. | |
| 2007/0071938 A1 | 3/2007 | Kawazoe | |
| 2007/0120328 A1 | 5/2007 | Haselbacher et al. | |
| 2008/0164658 A1* | 7/2008 | Do | 277/355 |
| 2008/0248271 A1 | 10/2008 | Erb et al. | |

FOREIGN PATENT DOCUMENTS

| | | |
|---|---|---|
| EP | 0 587 153 A2 | 9/1993 |
| EP | 1 821 008 A1 | 8/2007 |
| EP | 1 947 298 A2 | 7/2008 |
| JP | 2004 205003 A | 7/2004 |

OTHER PUBLICATIONS

European Search Report for EP Application No. 10251996.4, Jan. 12, 2012.
Partial European Search Report for EP Application No. 10251996, Oct. 7, 2011.

* cited by examiner

*Primary Examiner* — Dwayne J White
(74) *Attorney, Agent, or Firm* — Carlson, Gaskey & Olds, P.C.

(57) ABSTRACT

A seal assembly for a turbo machine, such as a turbo jet, includes a housing having a retainer secured relative to the housing. A seal is arranged between the housing and the retainer. The seal provides an opening configured to receive a penetrating element. The seal comprises a composite material. In one example, an anti-rotation feature prevents the seal from rotating relative to the housing. The anti-rotation feature includes a rivet received in a hole in the seal that cooperates with at least one of the housing and the retainer to maintain the seal in a desired angular position.

12 Claims, 2 Drawing Sheets

COMPOSITE SLIDER SEAL FOR TURBOJET PENETRATION

BACKGROUND

This disclosure relates to a seal assembly penetration thru the bypass fan ducts in a turbojet, for example. In particular, a composite slider seal for the penetration is disclosed.

The bypass fan ducts of some turbojet engines have more than thirty individual penetrations. The penetrations allow for the passage of penetrating elements such as oil lines, fuel lines, augmentor spray bars, engine igniters and boroscope plugs through the duct, for example. The penetrating elements are typically supported on the core, which is arranged radially inwardly of the ducts. As the core and the ducts change in overall length due to increased temperatures, the penetration seal assemblies allow for movement of the penetrating elements and maintain a seal around those penetrating elements to prevent hot fan air from leaking into the engine bay within which the turbojet is arranged. Current seals are typically constructed from sheet titanium.

SUMMARY

A seal assembly for a turbo machine, such as a turbojet, includes a housing having a retainer secured relative to the housing. A seal is arranged between the housing and the retainer. The seal provides an opening configured to receive a penetrating element. The seal comprises a composite material.

In one example where the opening of the seal is placed at an angle, an anti-rotation feature prevents the seal from rotating relative to the housing. The anti-rotation feature includes a rivet received in a hole in the seal that cooperates with at least one of the housing and the retainer to maintain the seal in a desired angular position.

BRIEF DESCRIPTION OF THE DRAWINGS

The disclosure can be further understood by reference to the following detailed description when considered in connection with the accompanying drawings wherein.

DETAILED DESCRIPTION

Figure 1:
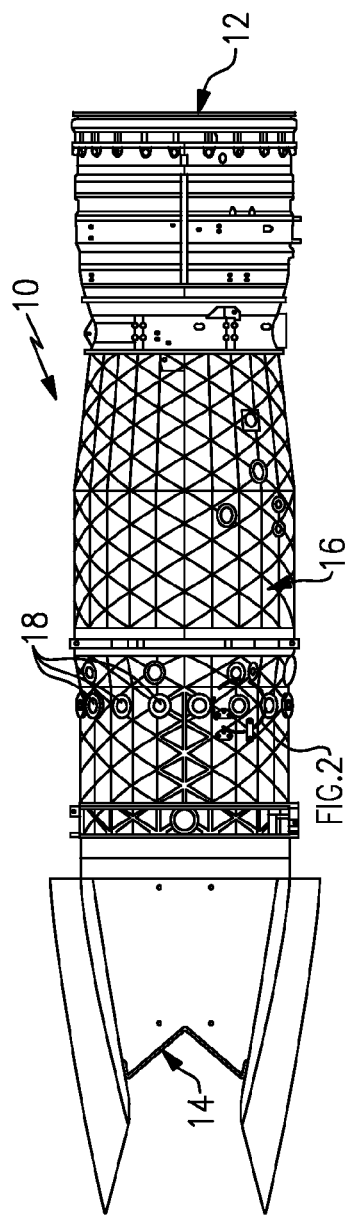
FIG. 1 is a elevational view of a turbojet with multiple penetrations.

A turbojet engine 10 is shown in FIG. 1 that includes an inlet 12 and an outlet 14. Bypass ducts 16 are arranged between the inlet 12 and outlet 14. The ducts 16 include multiple penetrations or apertures 18 that are configured to receive various penetrating elements, such as but not limited to oil lines, fuel lines, augmentor spray bars, engine igniters and boroscope plugs. Although a turbojet 10 is illustrated, it should be understood that other types of turbo machines or gas turbine engines may benefit from the disclosed seal assembly.

Figure 3:
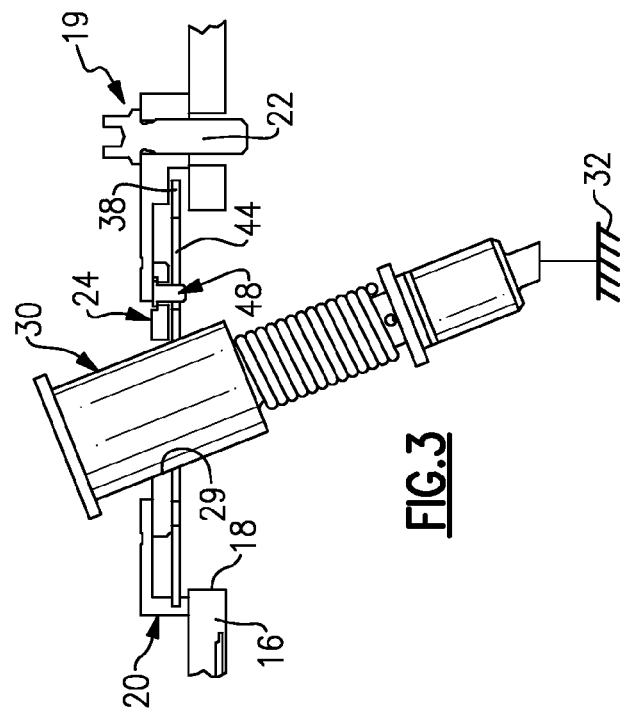
FIG. 3 is a cross-sectional view of the seal assembly shown in FIG. 2.
Figure 2:
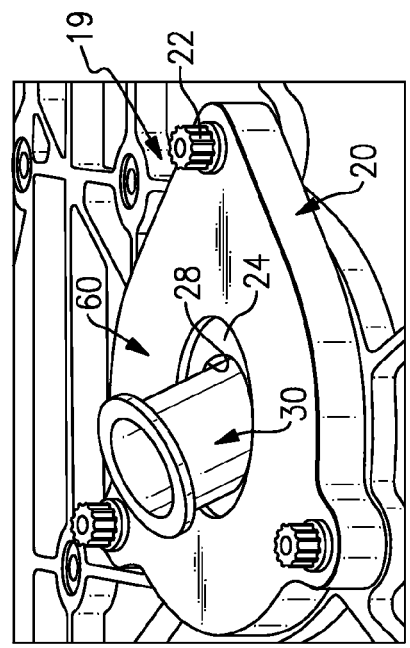
FIG. 2 is a perspective view of an angled seal assembly for an example penetrating element associated with one of the penetrations.
Figure 4:
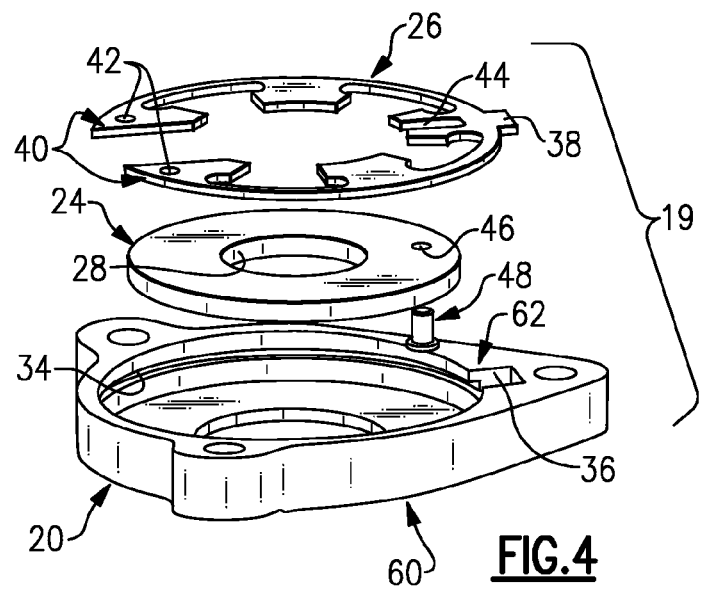
FIG. 4 is an exploded view of the seal assembly shown in FIGS. 2 and 3.
Figure 5:
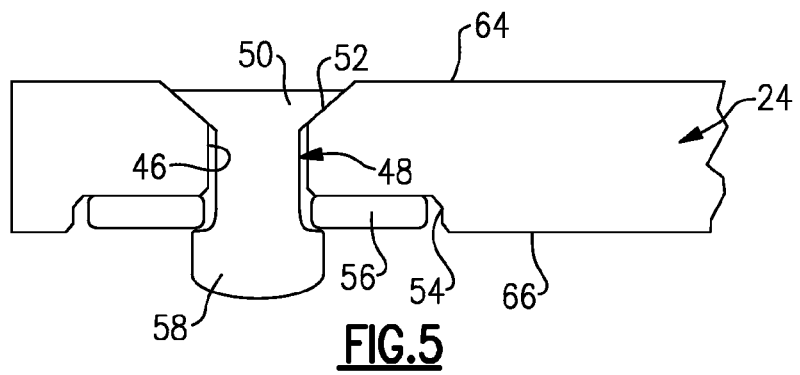
FIG. 5 is an enlarged cross-sectional view of a seal according to one example.
Figure 6:
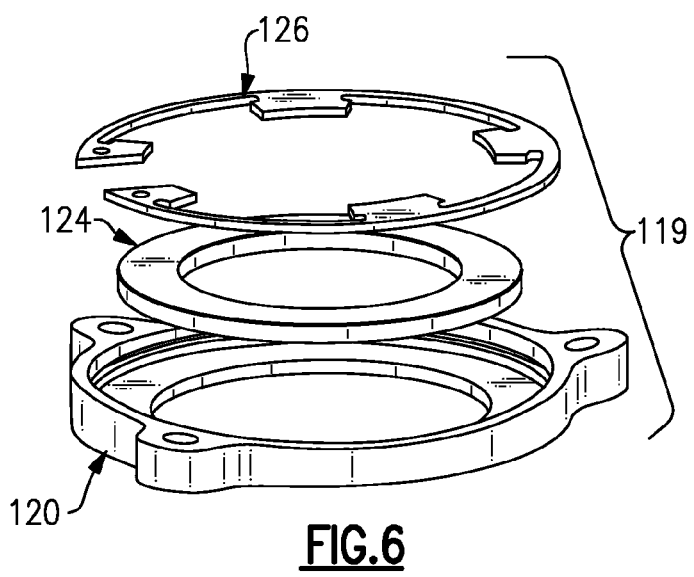
FIG. 6 is an exploded view of another example seal assembly.

Referring to FIGS. 2-4, a seal assembly 19 is used to seal a penetrating element 30 relative to the penetration 18 in the duct. In the example shown, the penetrating element 30 is a boroscope having a portion that is supported by a core 32. The core 32 houses various compressor and turbine stages, for example.

The seal assembly 19 includes a housing 20 secured to the duct 16 at an outer side 60 by fastening elements 22. A seal 24 is supported relative to the housing 20 at a recess in an inner side 62 using a retainer, such as a retaining ring 26, for example. In the example, the seal 24 has a generally circular perimeter and generally parallel opposing sides 64, 66. The penetrating element 30 extends through an opening 28 in the seal 24, which is centrally located in the example. The perimeter seals to the housing 20 and the penetrating element. Some penetrating elements may be positioned at an angle relative to the seal 24 such that the opening 28 is provided with a portion having an angled inner diameter surface 29 that is non-perpendicular to the opposing sides 64, 66. For such sealing configurations, the seal 24 is retained in a desired orientation relative to the housing 20 by an anti-rotation feature to facilitate insertion of the penetrating element 30 through the seal 24 during assembly.

The housing 20 includes an annular groove 34 and an adjoining notch 36 used in the case of an angled penetration. The retaining ring 26 is received in the annular groove 34 in an installed position. A tab 38 on the retaining ring 26 is received in the notch 36. Ears 40 having holes 42 facilitate installation of the retaining ring 26 into the groove 34 using snap-ring pliers or similar tool, for example.

The seal 24 includes a hole 46 receiving a rivet 48. The retaining ring 26 includes a slot 44 that receives the rivet 48 to angularly locate the seal 24 relative to the housing 20. The rivet 48 includes a frustoconical head 50, for example, received in a complementarily shaped countersunk bore 52 of the hole 46 at a first side 64 of the seal 24. A bore 54 is arranged on the second side 66 and receives a washer 56. The washer 56 receives an end 58 of the rivet 48 that is plastically deformed when installing the rivet 48 into the seal 24. The end 58 is received in the slot 44. In one example, the bore 56 has a 0.355-0.365 inch (9.02-9.27 mm) outer diameter and approximately a 0.035 inch (0.89 mm) depth. The rivet 48, for example, includes a 0.096-0.100 inch (2.44-2.54 mm) diameter shank with a 0.165-0.175 inch (4.19-4.45 mm)×100°±5° head 50. The deformed end 58 is approximately 0.118-0.140 inch (3.00-3.56 mm) in diameter and 0.060-0.100 inch (1.52-2.54 mm) in height.

The seal 24 is constructed from a composite material, which is non-metallic in one example. In one example, the material is a composite laminate material including multiple layers bound together with a polymeric resin, such as a polymide. In one example, the layers are constructed from a carbon fiber woven fabric. In one example, the composite seal 24 is constructed using a material available from DuPont under the trade name CP-2015. Instead of using a pin as is typical for locating titanium sheet seals, the rivet 48 and washer 56 arrangement remains secured to the seal 24 in a desired manner during use despite any creep the seal material may experience. The seal 24 is clamped securely between the washer 56 and the head 50 by the deformed end 58.

Although example embodiments have been disclosed, a worker of ordinary skill in this art would recognize that certain modifications would come within the scope of the claims.

For that reason, the following claims should be studied to determine their true scope and content.

What is claimed is:

1. A seal assembly for a turbo machine comprising:
a housing;
a retainer secured relative to the housing;
a seal arranged between the housing and retainer, the seal providing an opening configured to receive a penetrating element, the seal comprising a composite material, wherein the opening includes a surface having a portion that is at an non-perpendicular angle relative to generally parallel opposing sides of the seal; and
an anti-rotation feature cooperates with at least one of the housing and retainer to maintain an angular position of the seal relative to the housing.

2. The seal assembly according to claim 1, wherein the composite material includes multiple layers of carbon fiber fabric laminated together with a resin.

3. The seal assembly according to claim 1, wherein the anti-rotation feature includes a hole in the seal, and comprising a rivet arranged in the hole cooperating with the at least one of the housing and the retainer.

4. The seal assembly according to claim 3, wherein the housing includes a notch and the retainer includes a tab received in the notch, the retainer including a slot with the rivet received in the slot.

5. The seal assembly according to claim 4, wherein the rivet includes a plastically deformed end received in the slot.

6. The seal assembly according to claim 5, wherein the rivet includes a head on one side of the seal, and a washer is arranged between an opposite side of the seal and the plastically deformed end, the seal clamped between the washer and the head.

7. The seal assembly according to claim 6, wherein the hole at the one side includes a countersunk bore, the head of a generally complementary shape to the countersunk bore and received therein.

8. A seal for a gas turbine engine penetration seal assembly comprising:
a composite structure including carbon fiber fabric layers laminated with a resin, and an opening configured to receive a penetrating element, the composite structure includes generally parallel spaced apart sides and a generally circular perimeter, the opening centrally located within the perimeter, and the composite structure includes a hole spaced from the opening.

9. A gas turbine engine comprising:
a core;
a duct surrounding the core and having an aperture;
a housing secured to the duct around the aperture;
a seal supported by the housing and including an opening, the seal comprising a composite material;
a penetrating element extending through the opening and supported by the core;
a retainer secured relative to the housing, wherein the opening includes a surface having a portion that is at an non-perpendicular angle relative to generally parallel opposing sides of the seal; and
an anti-rotation feature cooperating with at least one of the housing and retainer to maintain an angular position of the seal relative to the housing.

10. The gas turbine engine according to claim 9, wherein the composite material includes multiple layers of carbon fiber fabric laminated together with a resin.

11. A gas turbine engine comprising:
a core;
a duct surrounding the core and having an aperture;
a housing secured to the duct around the aperture;
a seal supported by the housing and including an opening, the seal comprising a composite material;
a penetrating element extending through the opening and supported by the core
an anti-rotation feature cooperating with at least one of the housing and retainer to maintain an angular position of the seal relative to the housing, the anti-rotation feature includes a hole in the seal; and
a rivet arranged in the hole cooperating with the at least one of the housing and the retainer, the rivet includes a plastically deformed end received in the slot, the rivet includes a head on one side of the seal, and a washer is arranged between an opposite side of the seal and the plastically deformed end, the seal clamped between the washer and the head.

12. The gas turbine engine according to claim 11, wherein the housing includes a notch and the retainer includes a tab received in the notch, the retainer including a slot with the rivet received in the slot.

* * * * *